(12) United States Patent
Tsai et al.

(10) Patent No.: US 11,809,667 B2
(45) Date of Patent: Nov. 7, 2023

(54) TRANSPARENT CONDUCTIVE SUBSTRATE STRUCTURE USED FOR THERMOFORMING PROCESS

(71) Applicant: NANOBIT TECH. CO., LTD., Taoyuan (TW)

(72) Inventors: Sheng-Chieh Tsai, Taoyuan (TW); Yao-Zong Chen, Taoyuan (TW); Yu-Yang Chang, Taoyuan (TW); Hsiou-Ming Liu, Taoyuan (TW)

(73) Assignee: NANOBIT TECH. CO., LTD., Taoyuan (TW)

( * ) Notice: Subject to any disclaimer, the term of this patent is extended or adjusted under 35 U.S.C. 154(b) by 54 days.

(21) Appl. No.: 17/339,796

(22) Filed: Jun. 4, 2021

(65) Prior Publication Data

US 2022/0350443 A1    Nov. 3, 2022

(30) Foreign Application Priority Data

Apr. 29, 2021   (TW) .................................. 110115645

(51) Int. Cl.
| | |
|---|---|
| *G06F 3/044* | (2006.01) |
| *B29C 51/00* | (2006.01) |
| *B29C 51/14* | (2006.01) |
| *B29L 31/34* | (2006.01) |

(52) U.S. Cl.
CPC .......... *G06F 3/0445* (2019.05); *B29C 51/002* (2013.01); *B29C 51/14* (2013.01); *B29K 2995/0005* (2013.01); *B29K 2995/0006* (2013.01); *B29K 2995/0026* (2013.01);
(Continued)

(58) Field of Classification Search
CPC ......... G06F 3/0445; G06F 2203/04103; B29C 51/002; B29C 51/14; B29K 2995/0005; B29K 2995/0006; B29K 2995/0026; B29L 2031/3475
See application file for complete search history.

(56) References Cited

U.S. PATENT DOCUMENTS

| | | | |
|---|---|---|---|
| 7,244,901 B1 * | 7/2007 | Liao ...................... | H03K 17/962 200/600 |
| 10,485,094 B1 * | 11/2019 | Isohätälä .............. | H05K 3/0014 |
| 10,838,528 B2 * | 11/2020 | Fujii ................... | G01C 21/3664 |

(Continued)

*Primary Examiner* — Ibrahim A Khan
(74) *Attorney, Agent, or Firm* — Chun-Ming Shih; HDLS IPR SERVICES

(57) ABSTRACT

A transparent conductive substrate structure used for a thermoforming process includes a transparent cover plate and a touch sensing layer structure. The transparent cover plate includes a toughening layer on one side thereof. The touch sensing layer structure arranged on one surface of the toughening layer, and includes a first transparent conductive layer, a dielectric layer, a barrier layer, a second transparent conductive layer, and a buffer protective layer. Each transparent conductive layer is directly applied to the transparent cover plate, so that the thickness between the transparent conductive layers is below 1 µm. The thickness between layers may be reduced to increase the sensitivity of the touch sensing layer structure. To prevent each transparent conductive layer and an electrode wire layer from breaking during the thermoforming process, the transparent conductive substrate structure is combined with the buffer protective layer to strengthen the structure of each transparent conductive layer.

43 Claims, 5 Drawing Sheets

(52) U.S. Cl.
CPC ............... *B29L 2031/3475* (2013.01); *G06F 2203/04103* (2013.01)

(56) References Cited

U.S. PATENT DOCUMENTS

| | | | | |
|---|---|---|---|---|
| 11,059,266 B2* | 7/2021 | Wilson | ................... | G06F 3/041 |
| 11,111,396 B2* | 9/2021 | Yang | ................... | G02B 5/008 |
| 11,281,253 B2* | 3/2022 | Wilson | ................... | B32B 33/00 |
| 11,334,186 B1* | 5/2022 | Tsai | ................... | B29B 11/06 |
| 2003/0121767 A1* | 7/2003 | Caldwell | ................... | H03K 17/962 |
| | | | | 200/512 |
| 2005/0191520 A1* | 9/2005 | Guntermann | ................... | C09K 11/06 |
| | | | | 313/506 |
| 2009/0312514 A1* | 12/2009 | Lee | ................... | B29C 55/023 |
| | | | | 526/348.1 |
| 2011/0001721 A1* | 1/2011 | Chiang | ................... | G06F 3/0445 |
| | | | | 345/174 |
| 2012/0146921 A1* | 6/2012 | Park | ................... | G06F 3/0446 |
| | | | | 345/173 |
| 2012/0211264 A1* | 8/2012 | Milne | ................... | G06F 3/0443 |
| | | | | 174/250 |
| 2012/0268914 A1* | 10/2012 | Masumoto | ................... | G06F 3/0445 |
| | | | | 362/19 |
| 2013/0044443 A1* | 2/2013 | Yoshifusa | ................... | G06F 3/04164 |
| | | | | 361/749 |
| 2013/0271811 A1* | 10/2013 | Lam | ................... | G02B 5/23 |
| | | | | 359/266 |
| 2014/0028569 A1* | 1/2014 | Guard | ................... | G06F 3/0446 |
| | | | | 345/173 |
| 2014/0062920 A1* | 3/2014 | Lee | ................... | G06F 3/147 |
| | | | | 345/173 |
| 2014/0131188 A1* | 5/2014 | Isoda | ................... | H03K 17/962 |
| | | | | 200/600 |
| 2014/0145971 A1* | 5/2014 | Lin | ................... | G06F 3/0443 |
| | | | | 345/173 |
| 2014/0267946 A1* | 9/2014 | Ding | ................... | G06F 3/0447 |
| | | | | 264/105 |
| 2014/0267950 A1* | 9/2014 | Kang | ................... | G06F 3/0443 |
| | | | | 349/12 |
| 2015/0123911 A1* | 5/2015 | Poliakov | ................... | G06F 3/0412 |
| | | | | 29/829 |
| 2015/0185762 A1* | 7/2015 | Magi | ................... | G06F 1/1652 |
| | | | | 361/679.01 |
| 2015/0346866 A1* | 12/2015 | Kusunoki | ................... | G06F 1/1652 |
| | | | | 345/174 |
| 2015/0363023 A1* | 12/2015 | Kawaguchi | ................... | G06F 3/0448 |
| | | | | 345/174 |
| 2016/0001496 A1* | 1/2016 | Chow | ................... | G06F 3/0446 |
| | | | | 345/173 |
| 2016/0011691 A1* | 1/2016 | Shinkai | ................... | G06F 3/0447 |
| | | | | 345/174 |
| 2016/0093685 A1* | 3/2016 | Kwon | ................... | H10K 77/111 |
| | | | | 257/40 |
| 2016/0306475 A1* | 10/2016 | Cho | ................... | G06F 3/0446 |
| 2017/0003808 A1* | 1/2017 | Kim | ................... | H10K 59/124 |
| 2017/0017317 A1* | 1/2017 | Wang | ................... | G06F 3/041 |
| 2017/0357141 A1* | 12/2017 | De Smet | ................... | A61F 2/1627 |
| 2018/0206341 A1* | 7/2018 | Benwadih | ................... | H05K 3/0014 |
| 2018/0210573 A1* | 7/2018 | Hashida | ................... | G06F 3/042 |
| 2018/0275797 A1* | 9/2018 | Mitsuhashi | ................... | G06F 3/0445 |
| 2021/0064167 A1* | 3/2021 | Hsu | ................... | G06F 1/182 |
| 2021/0087429 A1* | 3/2021 | Leppäjärvi | ................... | C08F 283/12 |
| 2021/0089170 A1* | 3/2021 | Datta | ................... | G06F 3/0446 |
| 2022/0107668 A1* | 4/2022 | Cao | ................... | H04N 23/51 |
| 2022/0283669 A1* | 9/2022 | Xu | ................... | G06F 3/0446 |

* cited by examiner

TRANSPARENT CONDUCTIVE SUBSTRATE STRUCTURE USED FOR THERMOFORMING PROCESS

BACKGROUND

Technical Field

The present disclosure relates to a transparent conductive substrate structure, and more particularly to a transparent conductive substrate structure used for the thermoforming process.

Description of Related Art

The statements in this section merely provide background information related to the present disclosure and do not necessarily constitute prior art.

As shown in FIG. 1, a transparent conductive substrate structure is used for a thermoforming process in related art, and the transparent conductive substrate structure includes a first transparent cover plate (or housing) 100 and a touch sensing layer structure 200. The first transparent cover plate 100 includes a toughening layer 101 on one side of the surface of the first transparent cover plate 100. The touch sensing layer structure 200 sequentially includes a first transparent adhesive layer 201, a first transparent substrate 2022, a first transparent conductive layer 202, a second transparent adhesive layer 203, a second transparent substrate 2042, a second Transparent conductive layer 204, and a transparent protective layer 205. The first transparent conductive layer 202 and the second transparent conductive layer 204 each have a wiring area 2021, 2041, and the first transparent cover plate 100 is used as an outer layer to provide an outer surface for operation. As shown in FIG. 1, the transparent conductive substrate structure used for the thermoforming process in related art may be combined with home appliances, 3C products, operating hosts (such as car hosts), or displays, etc., or used as a shell. The transparent conductive substrate structure used for the thermoforming process in related art is used for touch operation or decoration.

The transparent conductive substrate structure in related art has the following shortcomings after undergoing the thermoforming process: The different composition materials of each layer, and the optical structure of each material is deformed due to the difference in expansion during the thermoforming process, and it is easy to cause the phenomenon of light interference with rainbow patterns. In addition, the different composition materials of the layers are likely to cause wrinkles in local appearance, and the first transparent adhesive layer and the second transparent adhesive layer have poor temperature tolerance for the thermoforming process, and which may easily cause technical problems such as glue overflow around the final product. The aforementioned technical problems will cause poor quality of the final product, and which in turn affects the appearance of the final product.

On the other hand, with the recent popularity of touch panels and touch pads, in order to further improve the operability and diversification of types of apparatus, there are more touch panels and touch pads with curved touch surfaces. For example, Japanese Patent No. JP2013-246741 discloses: a capacitive touch panel having a touch surface with a three-dimensional curved surface, which includes a transparent substrate sheet, and a conductive ink film with an elongation of less than or equal to 10% and a visible light transmittance of more than or equal to 90% using a dry coating process on one side of the substrate sheet, and then a laminated body with a plurality of main electrode regions of a main electrode lead layer is formed. In addition, the laminated body becomes a molded article including a three-dimensional curved surface by drawing processing after heating and softening.

However, during the bonding process of the touch laminate structure, stress tends to accumulate due to the contraction and expansion of different materials during the thermoforming process, which may cause technical problems such as deflection of the touch circuit, open circuit, increase in local resistance, or touch function abnormalities.

SUMMARY

Therefore, a purpose of the present disclosure is to provide a transparent conductive substrate structure used for a thermoforming process. Each transparent conductive layer is directly applied to the transparent cover plate, so that the thickness between the transparent conductive layers is less than or equal to 1 μm. For this reason, the thickness between layers may be reduced to increase the sensitivity of the touch sensing layer structure. In addition, in order to prevent each transparent conductive layer and an electrode wire layer from being broken during the thermoforming process, so the transparent conductive substrate structure is combined with the buffer protective layer to strengthen the structure of each transparent conductive layer. The buffer protective layer prevents the technical problems such as light interference or glue overflow around the final product after all layers are done.

In order to achieve the purpose above-mentioned, the present disclosure provides a transparent conductive substrate structure used for the thermoforming process, and the transparent conductive substrate structure includes a transparent cover plate and a touch sensing layer structure. The transparent cover plate includes a toughening layer on one side or two sides of the surface of the transparent cover plate. The touch sensing layer structure is arranged on one surface of the toughening layer, and the touch sensing layer structure includes a first transparent conductive layer and a buffer protective layer. The first transparent conductive layer is arranged on the other surface of the toughening layer, and a first wiring area is arranged on one side of the surface of the first transparent conductive layer, and a first electrode wire layer is arranged on the surface of the first wiring area. The buffer protective layer is arranged on the other surface of the first transparent conductive layer.

In some embodiments of the present disclosure, the transparent cover plate is made of polyethylene terephthalate, polyamide, polycarbonate, polymethyl methacrylate, or acrylic film.

In some embodiments of the present disclosure, the thickness of the transparent cover plate is between 100 μm and 2 mm.

In some embodiments of the present disclosure, the thickness of the transparent cover plate is 500 μm.

In some embodiments of the present disclosure, the thickness of the toughening layer is less than or equal to 3 μm.

In some embodiments of the present disclosure, the first transparent conductive layer includes a plurality of sensing lines of driving electrodes and a plurality of sensing lines of sensing electrodes, and the plurality of sensing lines of driving electrodes and the plurality of sensing lines of sensing electrodes are arranged in parallel and spaced apart.

In some embodiments of the present disclosure, the first wiring area is electrically connected to the plurality of sensing lines of driving electrodes and the plurality of sensing lines of sensing electrodes.

In some embodiments of the present disclosure, the first electrode wire layer is formed on the surface of the first wiring area by silver glue through screen printing or photolithography, and the first electrode wire layer is electrically connected to an external cable.

In some embodiments of the present disclosure, the external cable is a flexible cable.

In some embodiments of the present disclosure, the sheet resistance of the first transparent conductive layer is between 5 Ω/m2 and 300 Ω/m2, and the thickness of the first transparent conductive layer is between 10 nm and 200 nm.

In some embodiments of the present disclosure, the sheet resistance of the first transparent conductive layer is 175 Ω/m2, and the thickness of the first transparent conductive layer is 100 nm.

In some embodiments of the present disclosure, the first transparent conductive layer is made of metal, metal oxide, or organic conductive paint.

In some embodiments of the present disclosure, the organic conductive paint is a conductive paint of carbon nanotubes or poly 3,4-ethylenedioxythiophene.

In some embodiments of the present disclosure, the buffer protective layer is made of polyurethane glue, polyethylene terephthalate glue, high-density polyethylene glue, transparent acrylic glue, or silicon glue.

In some embodiments of the present disclosure, the thickness of the buffer protective layer is between 10 μm and 500 μm.

In some embodiments of the present disclosure, the thickness of the buffer protective layer is 250 μm.

In some embodiments of the present disclosure, the buffer protective layer is formed by coating or attaching a transparent protective film.

In some embodiments of the present disclosure, a chamfer of a curved area of the transparent conductive substrate structure is at least 1R or more.

In order to achieve the purpose above-mentioned, the present disclosure provides a transparent conductive substrate structure used for the thermoforming process, and the transparent conductive substrate structure includes a transparent cover plate and a touch sensing layer structure. The transparent cover plate includes a toughening layer on one side or two sides of the surface of the transparent cover plate. The touch sensing layer structure is arranged on one surface of the toughening layer, and the touch sensing layer structure includes a first transparent conductive layer, a dielectric layer, a barrier layer, a second transparent conductive layer, and a buffer protective layer. The first transparent conductive layer is arranged on the other surface of the toughening layer, and a first wiring area is arranged on one side of the surface of the first transparent conductive layer, and a first electrode wire layer is arranged on the surface of the first wiring area. The dielectric layer is arranged on the surface of the first transparent conductive layer. The barrier layer is arranged on the surface of the dielectric layer. The second transparent conductive layer is arranged on the surface of the barrier layer, and a second wiring area is arranged on one side of the surface of the second transparent conductive layer, and a second electrode wire layer is arranged on the surface of the second wiring area. The buffer protective layer is arranged on the other surface of the second transparent conductive layer.

In some embodiments of the present disclosure, the transparent cover plate is made of polyethylene terephthalate, polyamide, polycarbonate, polymethyl methacrylate, or acrylic film.

In some embodiments of the present disclosure, the thickness of the transparent cover plate is between 100 μm and 2 mm.

In some embodiments of the present disclosure, the thickness of the transparent cover plate is 500 μm.

In some embodiments of the present disclosure, the thickness of the toughening layer is less than or equal to 3 μm.

In some embodiments of the present disclosure, the first transparent conductive layer and the second transparent conductive layer are both made of metal, metal oxide, or organic conductive paint.

In some embodiments of the present disclosure, the organic conductive paint is a conductive paint of carbon nanotubes or poly 3,4-ethylenedioxythiophene.

In some embodiments of the present disclosure, the first transparent conductive layer includes a plurality of sensing lines of sensing electrodes, and the plurality of sensing lines of sensing electrodes are electrically connected to the first wiring area.

In some embodiments of the present disclosure, the second transparent conductive layer includes a plurality of sensing lines of driving electrodes, and the plurality of sensing lines of driving electrodes are electrically connected to the second wiring area.

In some embodiments of the present disclosure, the sheet resistance of the first transparent conductive layer and the sheet resistance of the second transparent conductive layer are both between 5 Ω/m2 and 300 Ω/m2, and the thickness of the first transparent conductive layer and the thickness of the second transparent conductive layer are both between 10 nm and 200 nm.

In some embodiments of the present disclosure, the sheet resistance of the first transparent conductive layer and the sheet resistance of the second transparent conductive layer are both 175 Ω/m2, and the thickness of the first transparent conductive layer and the thickness of the second transparent conductive layer are both 100 nm.

In some embodiments of the present disclosure, the first electrode wire layer on the first wiring area and the second electrode wire layer on the second wiring area are both silver glue.

In some embodiments of the present disclosure, the first electrode wire layer and the second electrode wire layer are both electrically connected to an external cable.

In some embodiments of the present disclosure, the external cable is a flexible cable.

In some embodiments of the present disclosure, the dielectric layer is made of polyetherimide, polycarbonate, or polymethyl methacrylate.

In some embodiments of the present disclosure, the thickness of the dielectric layer is between 1 nm and 100 nm.

In some embodiments of the present disclosure, the thickness of the dielectric layer is 50 nm.

In some embodiments of the present disclosure, the barrier layer is made of transparent acrylic or silicone.

In some embodiments of the present disclosure, the thickness of the barrier layer is between 100 nm and 500 nm.

In some embodiments of the present disclosure, the thickness of the barrier layer is 250 nm.

In some embodiments of the present disclosure, the buffer protective layer is made of transparent acrylic or silicone.

In some embodiments of the present disclosure, the thickness of the buffer protective layer is between 1 µm and 500 µm.

In some embodiments of the present disclosure, the thickness of the buffer protective layer is 100 µm.

In some embodiments of the present disclosure, the buffer protective layer is formed by a transparent protective film coated or attached.

In some embodiments of the present disclosure, the distance between the first transparent conductive layer and the second transparent conductive layer is less than or equal to 500 nm.

In some embodiments of the present disclosure, an operating distance between the transparent conductive substrate structure and a touch panel is more than or equal to 10 cm.

In some embodiments of the present disclosure, a chamfer of a curved area of the transparent conductive substrate structure is at least 1R or more.

DETAILED DESCRIPTION

The technical content and detailed description of the present disclosure are now described with the drawings as follows.

Figure 2:
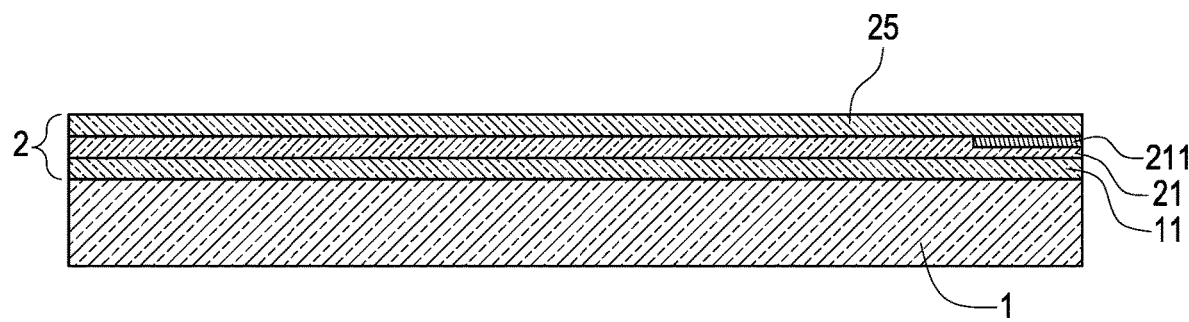
FIG. 2 is a schematic side view of single-layer transparent conductive substrate structure used for a thermoforming process according to a first embodiment of the present disclosure.

Please refer to FIG. 2, which is a schematic side view of single-layer transparent conductive substrate structure used for a thermoforming process according to a first embodiment of the present disclosure. As shown in the figure, the single-layer semi-finished product 10 of the transparent conductive substrate structure used for the thermoforming process according to the first embodiment of the present disclosure includes a transparent cover plate 1 and a touch sensing layer structure 2.

The transparent cover plate 1 is made of polyethylene terephthalate (PET), polyamide (PA), polycarbonate (PC), polymethyl methacrylate (PMMA), or acrylic film. The thickness of the transparent cover plate 1 is between 100 µm and 2 mm. This embodiment is exemplified with a flat transparent cover plate 1, and the thickness of the transparent cover plate 1 is 500 µm. The transparent cover plate 1 includes a toughening layer 11 on one side or two sides of the surface of the transparent cover plate 1. The toughening layer 11 is used to increase the structural strength of the transparent cover plate 1, and also used to increase the structural strength of the later coated conductive layer (for example, a first transparent conductive layer 21). In addition, the thickness of the toughening layer 11 is less than or equal to 3 µm. The surface of the toughening layer 11 is treated with plasma to increase the adhesion to the conductive layer (for example, the first transparent conductive layer 21).

The touch sensing layer structure 2 is arranged on one surface of the toughening layer 11, and the touch sensing layer structure 2 includes a first transparent conductive layer 21, an electrode wire layer (not shown), and a buffer protective layer 25.

The first transparent conductive layer 21 is arranged on the other surface of the toughening layer 11. A slit coating mechanism is used to coat an organic conductive material (PEDOT:PSS), and the organic conductive material is dried to form the first transparent conductive layer 21. The first transparent conductive layer 21 is used to form a plurality of sensing lines of driving electrodes (Tx) and a plurality of sensing lines of sensing electrodes (Rx). The plurality of sensing lines of driving electrodes (Tx) and the plurality of sensing lines of sensing electrodes (Rx) are arranged in parallel and spaced apart (not shown). After the first transparent conductive layer 21 forms the plurality of sensing lines of driving electrodes (Tx) and the plurality of sensing lines of sensing electrodes (Rx), the sheet resistance of the first transparent conductive layer 21 is between 5 Ω/m2 and 300 Ω/m2, and the thickness of the first transparent conductive layer 21 is between 10 nm and 200 nm. In some embodiments, the sheet resistance of the first transparent conductive layer 21 is 175 Ω/m2, and the thickness of the first transparent conductive layer 21 is 100 nm. A first wiring area 211 is arranged on specific ends of the plurality of sensing lines of driving electrodes (Tx) and the plurality of sensing lines of sensing electrodes (Rx), and the first wiring area 211 is electrically connected to the plurality of sensing lines of driving electrodes (Tx) and the plurality of sensing lines of sensing electrodes (Rx). The first electrode wire layer (not shown) is formed on the surface of the first wiring area 211 with silver glue by screen printing or photolithography, and the first electrode wire layer is electrically connected to an external cable (not shown). For example, the external cable is a flexible flat cable (FPC), and the FPC is used to attach to the first electrode wire layer. As shown in the figure, the first transparent conductive layer 21 is made of metal, metal oxide, or organic conductive paint. The organic conductive paint is a conductive paint of carbon nanotubes or (poly (3,4-ethylenedioxythiophene) polystyrene sulfonate) (PEDOT:PSS) with main component of poly 3,4-ethylenedioxythiophene (PEDOT).

The buffer protective layer 25 is arranged on the other surface of the first transparent conductive layer 21 by coating a transparent polyurethane (PU) glue on the first transparent conductive layer 21. The buffer protective layer 25 protects the first transparent conductive layer 21 from sensing circuit breaking or resistance increase during a non-planar molding process. The buffer protective layer 25 is made of polyurethane (PU) glue, polyethylene terephthalate (PET) glue, high-density polyethylene (PE) glue, transparent acrylic glue, or silicon glue. The thickness of the buffer protective layer 25 is between 10 μm and 500 μm, and the buffer protective layer 25 is formed by coating or attaching a transparent protective film. As shown in the figure, the thickness of the buffer protective layer 25 is 250 μm.

Figure 3:
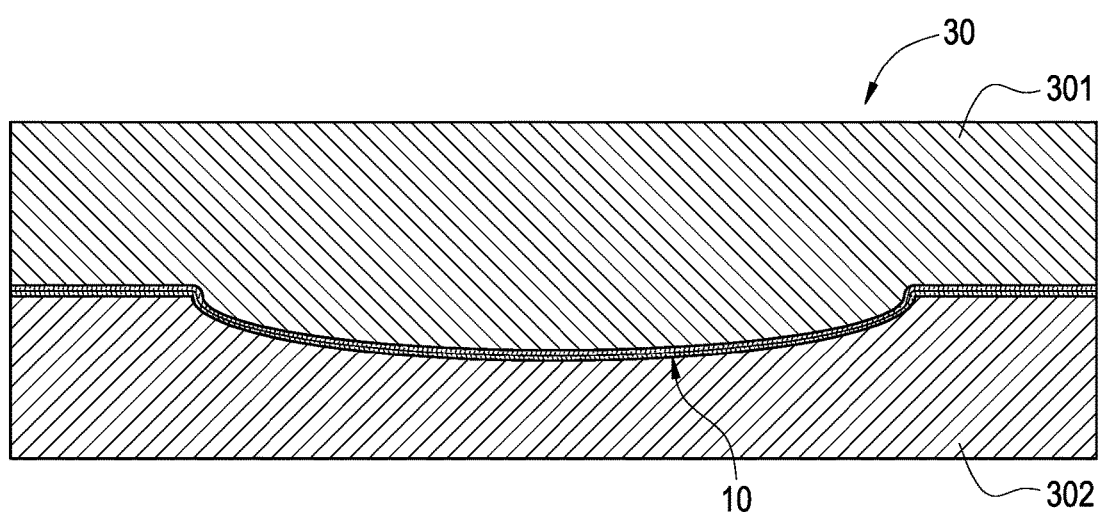
FIG. 3 is a schematic diagram of a molding process of the transparent conductive substrate structure used for the thermoforming process according to the first embodiment of the present disclosure.
Figure 4:
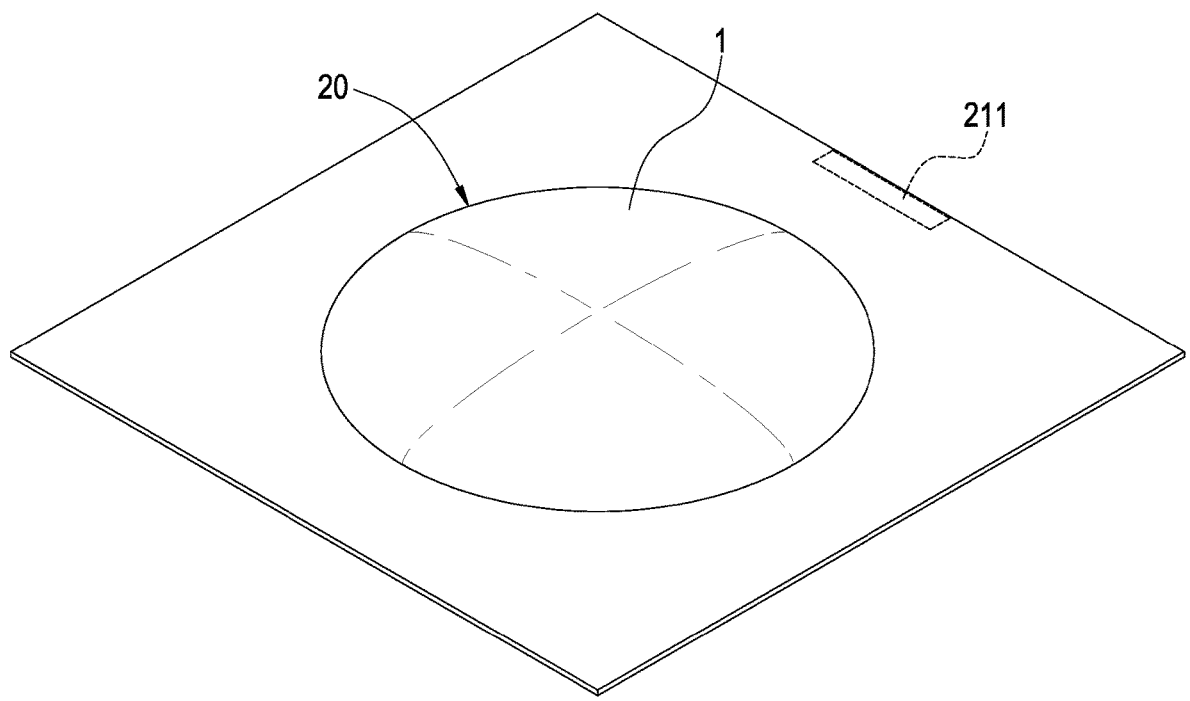
FIG. 4 is a perspective view of the transparent conductive substrate structure used for the thermoforming process after the molding process according to the first embodiment of the present disclosure.
Figure 5:
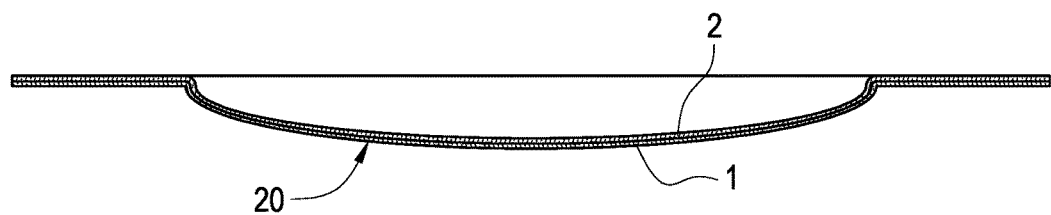
FIG. 5 is a sectional view of the FIG. 4.

Please refer to the FIG. 3, FIG. 4, and FIG. 5. FIG. 3 is a schematic diagram of a molding process of the transparent conductive substrate structure used for the thermoforming process according to the first embodiment of the present disclosure. FIG. 4 is a perspective view of the transparent conductive substrate structure used for the thermoforming process after the molding process according to the first embodiment of the present disclosure. FIG. 5 is a sectional view of the FIG. 4. As shown in the figure, the semi-finished product 10 of the transparent conductive substrate structure used for the thermoforming process of the present disclosure is made into a transparent conductive substrate structure 20 used for the thermoforming process. First, the semi-finished product 10 of the transparent conductive substrate structure is placed in a mold 30, and the semi-finished product 10 is molded by a female mold core 301 and a male mold core 302 of the mold 30. For the conditions during the molding process of the mold 30, temperature is between 250 degrees Celsius and 400 degrees Celsius, pressure is between 6 Bars and 15 Bars, and pressure time is between 10 seconds and 30 seconds. After demolding, the chamfer of the non-planar curved area may be at least 1R or more. Finally, the transparent conductive substrate structure 20 used for a non-planar thermoforming process of the present disclosure is finished.

The first transparent conductive layer 21 of the first embodiment of the present disclosure is designed as an ultra-thin structure with a thickness of less than or equal to 500 nm, which may improve touch sensitivity, reduce the demand for driving voltage, and enhance the touch sensing effect. The transparent conductive substrate structure 20 used for the non-planar thermoforming process may be used for single-point touch in a touch panel.

Figure 6:
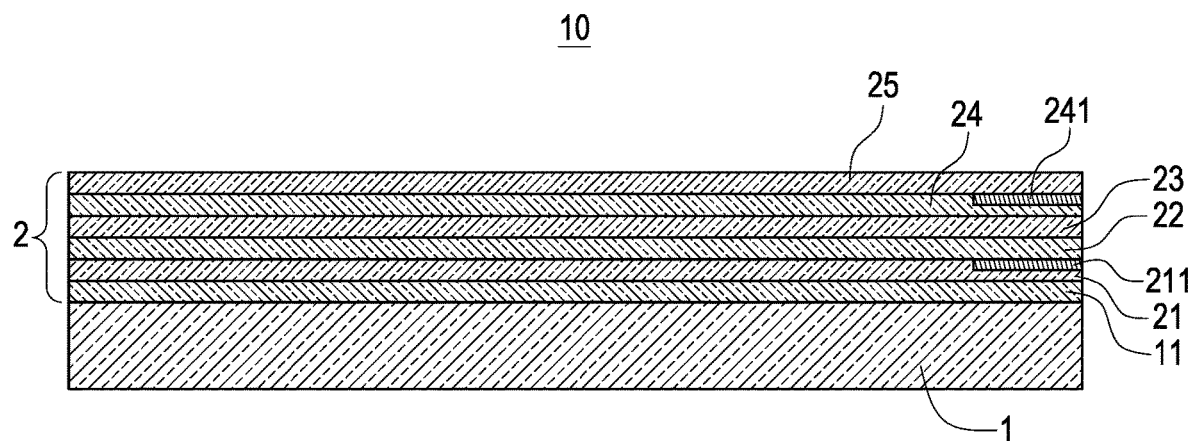
FIG. 6 is a schematic side view of double-layer transparent conductive substrate structure used for the thermoforming process according to a second embodiment of the present disclosure.

Please refer to FIG. 6, which is a schematic side view of double-layer transparent conductive substrate structure used for the thermoforming process according to a second embodiment of the present disclosure. As shown in the figure, the double-layer semi-finished product 10 of the transparent conductive substrate structure used for the thermoforming process according to the second embodiment of the present disclosure includes a transparent cover plate 1 and a touch sensing layer structure 2.

The transparent cover plate 1 is made of polyethylene terephthalate (PET), polyamide (PA), polycarbonate (PC), polymethyl methacrylate (PMMA), or acrylic film. The thickness of the transparent cover plate 1 is between 100 μm and 2 mm. This embodiment is exemplified with a flat transparent cover plate 1, and the thickness of the transparent cover plate 1 is 500 μm. The transparent cover plate 1 includes a toughening layer 11 on one side or two sides of the surface of the transparent cover plate 1. The toughening layer 11 is used to increase the structural strength of the transparent cover plate 1, and also used to increase the structural strength of the later coated conductive layer (for example, a first transparent conductive layer 21). In addition, the thickness of the toughening layer 11 is less than or equal to 3 μm. The surface of the toughening layer 11 is treated with plasma to increase the adhesion to the conductive layer (for example, the first transparent conductive layer 21).

The touch sensing layer structure 2 is arranged on one surface of the toughening layer 11, and the touch sensing layer structure 2 includes a first transparent conductive layer 21, a dielectric layer 22, a barrier layer 23, a second transparent conductive layer 24, and a buffer protective layer 25.

The first transparent conductive layer 21 is arranged on the other surface of the toughening layer 11. The slit coating mechanism is used to coat an organic conductive material (PEDOT:PSS), and the organic conductive material is dried to form the first transparent conductive layer 21. The first transparent conductive layer 21 is used to form the plurality of sensing lines of sensing electrodes (Rx), and the plurality of sensing lines of sensing electrodes (Rx) are arranged in parallel and spaced apart (not shown). After the first transparent conductive layer 21 forms the plurality of sensing lines of sensing electrodes (Rx), the sheet resistance of the first transparent conductive layer 21 is between 5 Ω/m2 and 300 Ω/m2, and the thickness of the first transparent conductive layer 21 is between 10 nm and 200 nm. In some embodiments, the sheet resistance of the first transparent conductive layer 21 is 175 Ω/m2, and the thickness of the first transparent conductive layer 21 is 100 nm. The first wiring area 211 is arranged on specific ends of the plurality of sensing lines of sensing electrodes (Rx), and the first wiring area 211 is electrically connected to the plurality of sensing lines of sensing electrodes (Rx). The first electrode wire layer (not shown) is formed on the surface of the first wiring area 211 with silver glue by screen printing or photolithography. The first electrode wire layer provides electric connection with an external cable (not shown) such as a flexible flat cable (FPC). As shown in the figure, the first transparent conductive layer 21 is made of metal, metal oxide, or organic conductive paint. The organic conductive paint is a conductive paint of carbon nanotubes or (poly (3,4-ethylenedioxythiophene) polystyrene sulfonate) (PEDOT:PSS) with main component of poly 3,4-ethylenedioxythiophene (PEDOT).

The dielectric layer 22 is arranged on the surface of the first transparent conductive layer 21, and the dielectric layer 22 is coated with a PEI solvent by a slit coater. The dielectric layer 22 forms a transparent film after drying. The dielectric layer 22 may provide enhanced protection and strengthen for the first transparent conductive layer 21. The dielectric layer 22 has a specific thickness to increase the sensitivity and a sensing capacitance value between the first transparent conductive layer 21 and the second transparent conductive layer 24. In this figure, the dielectric layer 22 is made of polyetherimide (PEI), polycarbonate (PC), or polymethyl methacrylate (PMMA), and a thickness of the dielectric layer 22 is between 1 nm and 100 nm. In some embodiments, the thickness of the dielectric layer 22 is 50 nm, and the dielectric layer 22 may be formed by coating.

The barrier layer 23 is arranged on the surface of the dielectric layer 22, and the barrier layer 23 is coated with a transparent acrylic glue, polyurethane (PU) glue or silicon rubber by a slit coater. The thickness of the barrier layer 23 is between 100 nm and 500 nm. In some embodiments, the thickness of the barrier layer 23 is 250 nm. The barrier layer 23 is arranged on the surface of the dielectric layer 22, and the barrier layer 23 is used to insulate and block the first transparent conductive layer 21 and the second transparent conductive layer 24. The barrier layer 23 is also used as a basis for the coating and adhesion of the second transparent conductive layer 24, and the barrier layer 23 protects the sensing circuit from breaking circuit or resistance increase during the molding process.

The second transparent conductive layer 24 is arranged on the other surface of the barrier layer 23. The slit coating mechanism is used to coat an organic conductive material (PEDOT:PSS), and the organic conductive material is dried and etched to form the plurality of sensing lines of driving electrodes (Tx) (not shown). The sheet resistance of the second transparent conductive layer 24 is between 5 Ω/m2 and 300 Ω/m2, and the thickness of the second transparent conductive layer 24 is between 10 nm and 200 nm. In some embodiments, the sheet resistance of the second transparent conductive layer 24 is 175 Ω/m2, and the thickness of the second transparent conductive layer 24 is 100 nm. The second wiring area 241 is arranged on specific ends of the plurality of sensing lines of driving electrodes (Tx), and the second wiring area 241 is electrically connected to the plurality of sensing lines of driving electrodes (Tx). The second electrode wire layer (not shown) is formed on the surface of the second wiring area 241 with silver glue by screen printing or photolithography. The first electrode wire layer provides electric connection to an external cable (not shown) such as a flexible flat cable (FPC). As shown in the figure, the second transparent conductive layer 24 is made of metal, metal oxide, or organic conductive paint. The organic conductive paint is a conductive paint of carbon nanotubes or (poly (3,4-ethylenedioxythiophene) polystyrene sulfonate) (PEDOT:PSS) with main component of poly 3,4-ethylenedioxythiophene (PEDOT).

The buffer protective layer 25 is arranged on the other surface of the second transparent conductive layer 24 by coating a transparent polyurethane (PU) glue on the second transparent conductive layer 24. The buffer protective layer 25 protects and strengthens the second transparent conductive layer 24 to prevent the sensing circuit from breaking circuit or the resistance increase during a non-planar molding process. The buffer protective layer 25 is made of polyurethane (PU) glue, polyethylene terephthalate (PET) glue, high-density polyethylene (PE) glue, transparent acrylic glue, or silicon glue. The thickness of the buffer protective layer 25 is between 10 μm and 500 μm, and the buffer protective layer 25 is formed by a transparent protective film coated or attached. As shown in the figure, the thickness of the buffer protective layer 25 is 250 μm.

Figure 7:
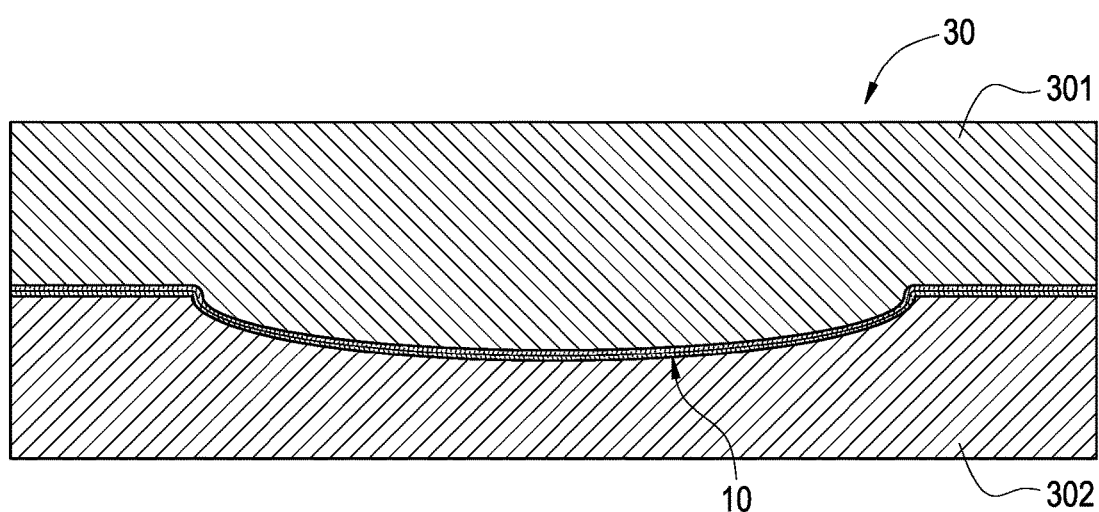
FIG. 7 is a schematic diagram of the molding process of the transparent conductive substrate structure used for the thermoforming process according to the second embodiment of the present disclosure.
Figure 8:
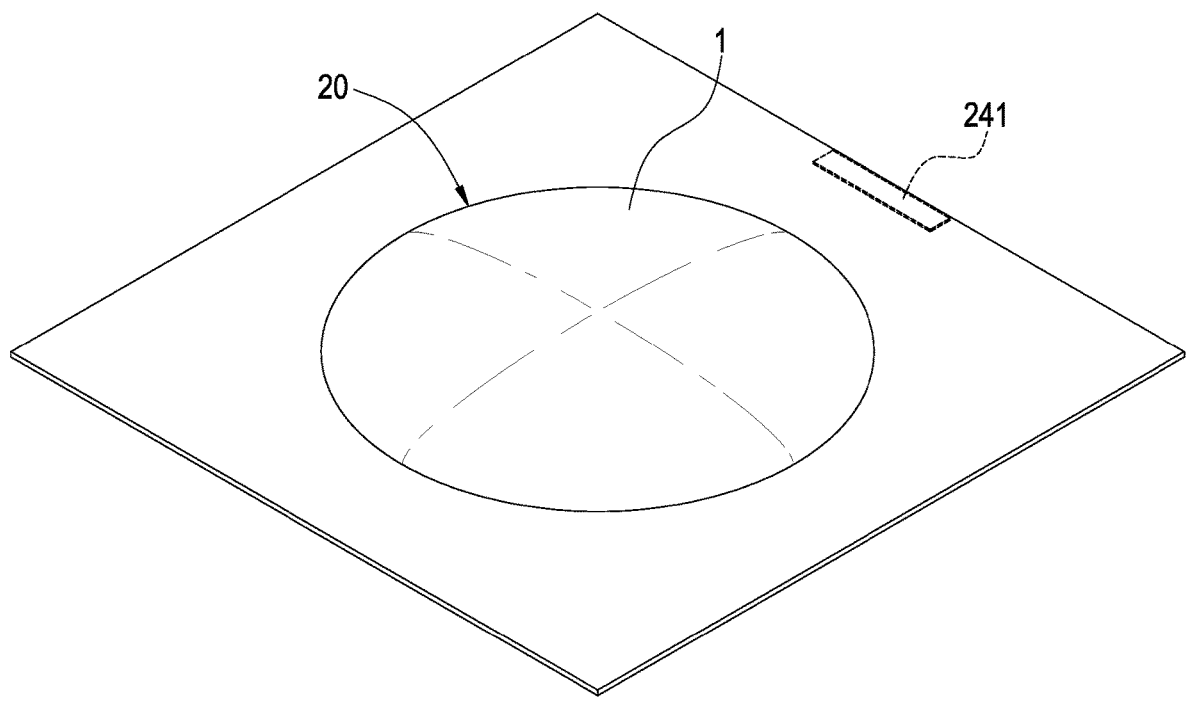
FIG. 8 is a perspective view of the transparent conductive substrate structure used for the thermoforming process after the molding process according to the second embodiment of the present disclosure.
Figure 9:
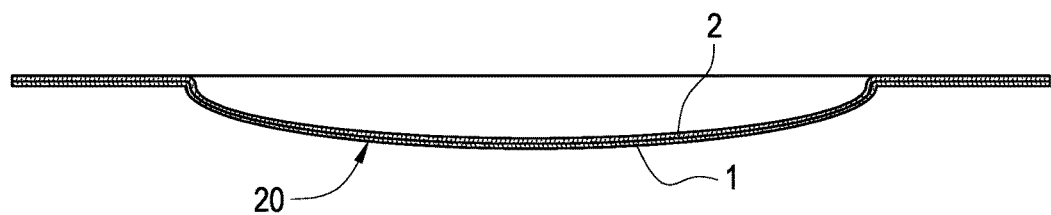
FIG. 9 is a sectional view of the FIG. 8.

Please refer to the FIG. 7, FIG. 8, and FIG. 9. FIG. 7 is a schematic diagram of the molding process of the transparent conductive substrate structure used for the thermoforming process according to the second embodiment of the present disclosure. FIG. 8 is a perspective view of the transparent conductive substrate structure used for the thermoforming process after the molding process according to the second embodiment of the present disclosure. FIG. 9 is a sectional view of the FIG. 8. As shown in the figure, the semi-finished product 10 of the transparent conductive substrate structure used for the thermoforming process of the present disclosure is made into the transparent conductive substrate structure 20 used for the thermoforming process. First, the semi-finished product 10 of the transparent conductive substrate structure is placed in a mold 30, and the semi-finished product 10 is molded by a female mold core 301 and a male mold core 302 of a mold 30. For the conditions during the molding process of the mold 30, temperature is between 250 degrees Celsius and 400 degrees Celsius, pressure is between 6 Bars and 15 Bars, and pressure time is between 10 seconds and 30 seconds. After demolding, the chamfer of the non-planar curved area may be at least 1R or more. Finally, the transparent conductive substrate structure 20 used for the non-planar thermoforming process of the present disclosure is finished.

The first transparent conductive layer 21 and the second transparent conductive layer 24 of the second embodiment of the present disclosure are designed to have very small separation therebetween (the distance is less than or equal to 500 nm), while the dielectric layer 22 and the barrier layer 23 are sandwiched between the first transparent conductive layer 21 and the second transparent conductive layer 24 to form an ultra-thin structure. The small separation between first transparent conductive layer 21 and the second transparent conductive layer 24 may improve touch sensitivity, reduce the demand for driving voltage, and enhance the touch sensing effect. An operating distance between the transparent conductive substrate structure 20 and the touch panel is more than or equal to 10 cm for the non-planar thermoforming process, which significantly increases the operator's requirements.

Figure 1:
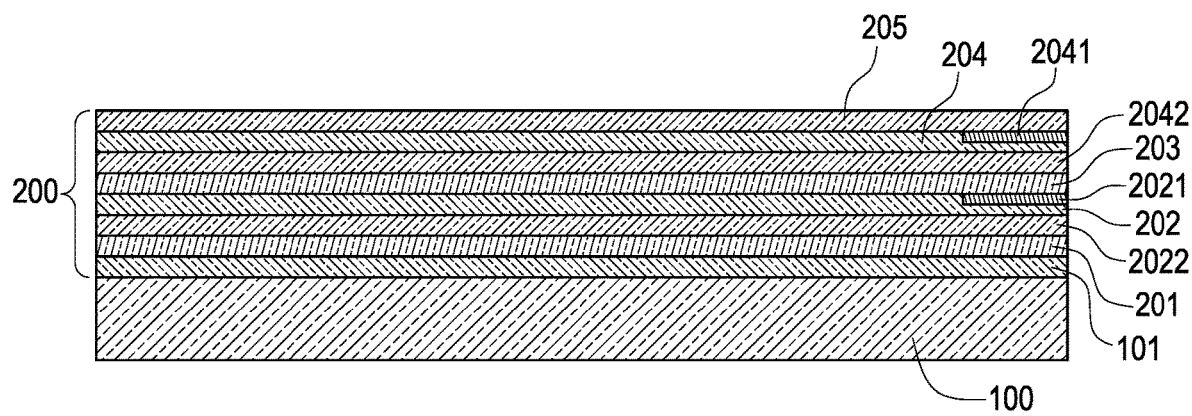
FIG. 1 is a schematic diagram of a transparent conductive substrate structure in related art.

A comparative example 1 is a semi-finished product of a transparent conductive substrate structure used for the thermoforming process in related art. Please refer to the structure of FIG. 1, and refer to the method of the thermoforming process of the second embodiment of the present disclosure. The difference between the comparative example 1 and the second embodiment of the present disclosure is that the transparent touch sensing layer structure 200 and the first transparent cover plate 100 are directly attached to a first transparent adhesive layer (e.g., optically clear adhesive, OCA) 201 with a thickness of 100 μm. The touch sensing layer structure 200 includes a first transparent conductive layer 202 and the second transparent conductive layer 204 with a second transparent adhesive layer 203 bonded therebetween. The thickness of the first transparent conductive layer 202 and the second transparent conductive layer 204 are both 125 μm. The first transparent conductive layer 202 and the second transparent conductive layer 204 are composed of a PET transparent substrate (for example, the first transparent substrate 2022 and the second transparent substrate 2042) with a transparent conductive layer on the surface, and that is different from each transparent conductive layer is directly applied to the transparent cover plate of the present disclosure. Each of the transparent conductive layers 202 and 204 is etched to form Rx and Tx sensing lines and to form wiring areas 2021 and 2041 respectively. Please refer to the finished product of the comparative example 1 formed by the method of the thermoforming process of the second embodiment of the present disclosure. After the thermoforming process, the first transparent adhesive layer 201 and second transparent adhesive layer 203 will exudate due to extrusion through the periphery of the structure, and easily stick to dirt. The appearance of the structure may clearly see the phenomenon of light interference with rainbow patterns.

A comparative example 2 is substantially the same as the embodiment 1 of the present disclosure, except that the first transparent conductive layer 21 in the structure is made of inorganic metal oxide ITO by a sputter, and the thickness of the first transparent conductive layer 21 is between 10 nm and 500 nm. After the thermoforming process, the first transparent conductive layer 21 is partially disconnected, and the touch sensing is poor.

A comparative example 3 is substantially the same as the embodiment 1 of the present disclosure, except that a thickness of the buffer protective layer 25 is 5 μm. After the thermoforming process, the first transparent conductive layer 21 is partially disconnected, and the touch sensing is poor.

A comparative example 4 is substantially the same as the embodiment 2 of the present disclosure, except that the barrier layer 23 is not included in the structure. Through structural analysis, it may be found that a part of the ink applied to the second transparent conductive layer 24 penetrates the dielectric layer 22, and then contaminates the first transparent conductive layer 21, resulting in poor quality.

The characteristics of the finished products of the embodiment and the comparative example after the thermoforming process are as follows:

|  | embodiment 1 | embodiment 2 | comparative example 1 | comparative example 2 | comparative example 3 | comparative example 4 |
|---|---|---|---|---|---|---|
| appearance | flat, furrowless, and without rainbow pattern | flat, furrowless, and without rainbow pattern | there are wrinkles at the forming bends, and with rainbow pattern | flat without wrinkles, and no rainbow pattern | flat without wrinkles, and no rainbow pattern | — |
| touch sensing characteristics | normal | normal | normal | poor | poor | poor |
| sensing distance from the touch panel | 100 mm | 100 mm | 20 mm | — | — | — |

Based on the above results, the present disclosure combines transparent conductive substrate structure with the non-planar thermoforming process. The non-planar design may also match the structural requirements of related application products, and is not limited to planar devices, which includes control switches for household appliances such as lighting fixtures, electric fans, etc., or non-planar control panels in the cockpit of a car.

In addition, the transparent conductive substrate structure 20 used for the non-planar thermoforming process is designed to add a strengthening layer to the sensing layer, which may improve the product yield during the thermoforming process, avoid the risk of disconnection or partial disconnection of each conductive circuit, and prolong the life of the substrate.

The technical content is only some embodiments of the present disclosure, and is not used to limit the scope of the present disclosure. Any modification of the structure, the change of the proportional relationship, or the adjustment of the size, should be within the scope of the technical contents disclosed by the present disclosure without affecting the effects and the achievable effects of the present disclosure.

What is claimed is:

1. A transparent conductive substrate structure used for a thermoforming process, and the transparent conductive substrate structure comprising:
   a transparent cover plate comprising a toughening layer on one side or two sides of a surface of the transparent cover plate, and
   a touch sensing layer structure arranged on one surface of the toughening layer, and the touch sensing layer structure comprising:
   a first transparent conductive layer directly arranged on the toughening layer, and a first wiring area arranged on one side of a surface of the first transparent conductive layer, and a first electrode wire layer arranged on a surface of the first wiring area, and
   a buffer protective layer arranged on the other surface of the first transparent conductive layer,
   wherein, a thickness of the toughening layer is less than or equal to 3 μm, and a surface of the toughening layer is treated with plasma to increase adhesion between the toughening layer and the first transparent conductive layer.

2. The transparent conductive substrate structure used for the thermoforming process as claimed in claim 1, wherein the transparent cover plate is made of polyethylene terephthalate, polyamide, polycarbonate, polymethyl methacrylate, or acrylic film.

3. The transparent conductive substrate structure used for the thermoforming process as claimed in claim 1, wherein the thickness of the transparent cover plate is between 100 μm and 2 mm.

4. The transparent conductive substrate structure used for the thermoforming process as claimed in claim 3, wherein the thickness of the transparent cover plate is 500 μm.

5. The transparent conductive substrate structure used for the thermoforming process as claimed in claim 1, wherein the first transparent conductive layer comprises a plurality of sensing lines of driving electrodes and a plurality of sensing lines of sensing electrodes, and the plurality of sensing lines of driving electrodes and the plurality of sensing lines of sensing electrodes are arranged in parallel and spaced apart.

6. The transparent conductive substrate structure used for the thermoforming process as claimed in claim 5, wherein the first wiring area is electrically connected to the plurality of sensing lines of driving electrodes and the plurality of sensing lines of sensing electrodes.

7. The transparent conductive substrate structure used for the thermoforming process as claimed in claim 1, wherein the first electrode wire layer is formed on the surface of the first wiring area by silver glue through screen printing or photolithography, and the first electrode wire layer is electrically connected to an external cable.

8. The transparent conductive substrate structure used for the thermoforming process as claimed in claim 7, wherein the external cable is a flexible cable.

9. The transparent conductive substrate structure used for the thermoforming process as claimed in claim 1, wherein the sheet resistance of the first transparent conductive layer is between 5 Ω/m2 and 300 Ω/m2, and the thickness of the first transparent conductive layer is between 10 nm and 200 nm.

10. The transparent conductive substrate structure used for the thermoforming process as claimed in claim 9, wherein the sheet resistance of the first transparent conductive layer is 175Ω/m2, and the thickness of the first transparent conductive layer is 100 nm.

11. The transparent conductive substrate structure used for the thermoforming process as claimed in claim 1, wherein the first transparent conductive layer is made of metal, metal oxide, or organic conductive paint.

12. The transparent conductive substrate structure used for the thermoforming process as claimed in claim 11, wherein the organic conductive paint is a conductive paint of carbon nanotubes or poly 3,4-ethylenedioxythiophene.

13. The transparent conductive substrate structure used for the thermoforming process as claimed in claim 1, wherein the buffer protective layer is made of polyurethane glue, polyethylene terephthalate glue, high-density polyethylene glue, transparent acrylic glue, or silicon glue.

14. The transparent conductive substrate structure used for the thermoforming process as claimed in claim 1, wherein the thickness of the buffer protective layer is between 10 μm and 500 μm.

15. The transparent conductive substrate structure used for the thermoforming process as claimed in claim 14, wherein the thickness of the buffer protective layer is 250 μm.

16. The transparent conductive substrate structure used for the thermoforming process as claimed in claim 1, wherein the buffer protective layer is formed by a transparent protective film coated or attached.

17. The transparent conductive substrate structure used for the thermoforming process as claimed in claim 1, wherein a chamfer of a curved area of the transparent conductive substrate structure is at least 1R or more.

18. A transparent conductive substrate structure used for a thermoforming process, and the transparent conductive substrate structure comprising:
a transparent cover plate comprising a toughening layer on one side or two sides of a surface of the transparent cover plate, and
a touch sensing layer structure arranged on one surface of the toughening layer, and the touch sensing layer structure comprising:
a first transparent conductive layer directly arranged on the toughening layer, and a first wiring area arranged on one side of a surface of the first transparent conductive layer, and a first electrode wire layer arranged on a surface of the first wiring area,
a dielectric layer arranged on the surface of the first transparent conductive layer,
a barrier layer arranged on a surface of the dielectric layer,
a second transparent conductive layer arranged on a surface of the barrier layer, and a second wiring area arranged on one side of a surface of the second transparent conductive layer, and a second electrode wire layer arranged on a surface of the second wiring area, and
a buffer protective layer arranged on the other surface of the second transparent conductive layer;
wherein, a distance between the first transparent conductive layer and the second transparent conductive layer is less than or equal to 500 nm,
a thickness of the toughening layer is less than or equal to 3 μm, and
a surface of the toughening layer is treated with plasma to increase adhesion between the toughening layer and the first transparent conductive layer.

19. The transparent conductive substrate structure used for the thermoforming process as claimed in claim 18, wherein the transparent cover plate is made of polyethylene terephthalate, polyamide, polycarbonate, polymethyl methacrylate, or acrylic film.

20. The transparent conductive substrate structure used for the thermoforming process as claimed in claim 18, wherein the thickness of the transparent cover plate is between 100 μm and 2 mm.

21. The transparent conductive substrate structure used for the thermoforming process as claimed in claim 20, wherein the thickness of the transparent cover plate is 500 μm.

22. The transparent conductive substrate structure used for the thermoforming process as claimed in claim 18, wherein the first transparent conductive layer and the second transparent conductive layer are both made of metal, metal oxide, or organic conductive paint.

23. The transparent conductive substrate structure used for the thermoforming process as claimed in claim 22, wherein the organic conductive paint is a conductive paint of carbon nanotubes or poly 3,4-ethylenedioxythiophene.

24. The transparent conductive substrate structure used for the thermoforming process as claimed in claim 18, wherein the first transparent conductive layer comprises a plurality of sensing lines of sensing electrodes, and the plurality of sensing lines of sensing electrodes are electrically connected to the first wiring area.

25. The transparent conductive substrate structure used for the thermoforming process as claimed in claim 18, wherein the second transparent conductive layer comprises a plurality of sensing lines of driving electrodes, and the plurality of sensing lines of driving electrodes are electrically connected to the second wiring area.

26. The transparent conductive substrate structure used for the thermoforming process as claimed in claim 18, wherein the sheet resistance of the first transparent conductive layer and the sheet resistance of the second transparent conductive layer are both between 5 $\Omega/m2$ and 300 $\Omega/m2$, and the thickness of the first transparent conductive layer and the thickness of the second transparent conductive layer are both between 10 nm and 200 nm.

27. The transparent conductive substrate structure used for the thermoforming process as claimed in claim 26, wherein the sheet resistance of the first transparent conductive layer and the sheet resistance of the second transparent conductive layer are both 175 $\Omega/m2$, and the thickness of the first transparent conductive layer and the thickness of the second transparent conductive layer are both 100 nm.

28. The transparent conductive substrate structure used for the thermoforming process as claimed in claim 18, wherein the first electrode wire layer on the first wiring area and the second electrode wire layer on the second wiring area are both silver glue.

29. The transparent conductive substrate structure used for the thermoforming process as claimed in claim 18, wherein the first electrode wire layer and the second electrode wire layer are both electrically connected to an external cable.

30. The transparent conductive substrate structure used for the thermoforming process as claimed in claim 29, wherein the external cable is a flexible cable.

31. The transparent conductive substrate structure used for the thermoforming process as claimed in claim 18, wherein the dielectric layer is made of polyetherimide, polycarbonate, or polymethyl methacrylate.

32. The transparent conductive substrate structure used for the thermoforming process as claimed in claim 18, wherein the thickness of the dielectric layer is between 1 nm and 100 nm.

33. The transparent conductive substrate structure used for the thermoforming process as claimed in claim 32, wherein the thickness of the dielectric layer is 50 nm.

34. The transparent conductive substrate structure used for the thermoforming process as claimed in claim 18, wherein the barrier layer is made of transparent acrylic or silicone.

35. The transparent conductive substrate structure used for the thermoforming process as claimed in claim 18, wherein the thickness of the barrier layer is between 100 nm and 500 nm.

36. The transparent conductive substrate structure used for the thermoforming process as claimed in claim 35, wherein the thickness of the barrier layer is 250 nm.

37. The transparent conductive substrate structure used for the thermoforming process as claimed in claim 18, wherein the buffer protective layer is made of transparent acrylic or silicone.

38. The transparent conductive substrate structure used for the thermoforming process as claimed in claim 18, wherein the thickness of the buffer protective layer is between 1 μm and 500 μm.

39. The transparent conductive substrate structure used for the thermoforming process as claimed in claim 38, wherein the thickness of the buffer protective layer is 100 μm.

40. The transparent conductive substrate structure used for the thermoforming process as claimed in claim 18, wherein the buffer protective layer is formed by a transparent protective film coated or attached.

41. The transparent conductive substrate structure used for the thermoforming process as claimed in claim 18, wherein the distance between the first transparent conductive layer and the second transparent conductive layer is less than or equal to 500 nm.

42. The transparent conductive substrate structure used for the thermoforming process as claimed in claim 18, wherein an operating distance between the transparent conductive substrate structure and a touch panel is more than or equal to 10 cm.

43. The transparent conductive substrate structure used for the thermoforming process as claimed in claim 18, wherein a chamfer of a curved area of the transparent conductive substrate structure is at least 1R or more.

* * * * *